(12) United States Patent
Salmaninejad Mehrabadi

(10) Patent No.: US 12,420,390 B2
(45) Date of Patent: Sep. 23, 2025

(54) TORQUE TOOL WITH FAULT PROTECTION AND A METHOD OF OPERATING THE SAME

(71) Applicant: NEW WORLD TECHNOLOGIES INC., Abbotsford (CA)

(72) Inventor: Amir Salmaninejad Mehrabadi, Abbotsford (CA)

( * ) Notice: Subject to any disclaimer, the term of this patent is extended or adjusted under 35 U.S.C. 154(b) by 0 days.

(21) Appl. No.: 18/735,733

(22) PCT Filed: May 5, 2023

(86) PCT No.: PCT/CA2023/050617
§ 371 (c)(1),
(2) Date: Jun. 6, 2024

(87) PCT Pub. No.: WO2024/229548
PCT Pub. Date: Nov. 14, 2024

(65) Prior Publication Data
US 2025/0262729 A1  Aug. 21, 2025

(51) Int. Cl.
*B25B 23/147* (2006.01)
*H02P 29/024* (2016.01)
*B25B 23/00* (2006.01)

(52) U.S. Cl.
CPC ......... *B25B 23/147* (2013.01); *H02P 29/027* (2013.01); *B25B 23/0078* (2013.01)

(58) Field of Classification Search
CPC ... B25B 23/007; B25B 23/0078; B25B 23/02; B25B 23/14; B25B 23/147; B25B 23/1475; B25B 23/15; B25B 23/16; B25F 5/001; H02P 29/02; H02P 29/027; H02P 29/028; H02H 3/08; H02H 3/087; H02H 3/24

See application file for complete search history.

(56) References Cited

U.S. PATENT DOCUMENTS

| | | | | |
|---|---|---|---|---|
| 5,440,215 | A | * | 8/1995 | Gilmore ................ B25F 5/001 388/930 |
| 7,400,106 | B2 | | 7/2008 | DeCicco et al. |
| 8,881,842 | B2 | | 11/2014 | Borinato et al. |
| 10,357,871 | B2 | | 7/2019 | Thorson et al. |
| 11,491,617 | B2 | | 11/2022 | Leong et al. |
| 2015/0200537 | A1 | | 7/2015 | Kang et al. |
| 2022/0006283 | A1 | * | 1/2022 | Dukaric ................ H02H 7/085 |

FOREIGN PATENT DOCUMENTS

| | | | | |
|---|---|---|---|---|
| EP | 2534745 | A1 | 12/2012 | |
| EP | 2688080 | B1 * | 5/2019 | ............. H01H 9/063 |

* cited by examiner

*Primary Examiner* — Robert J Scruggs

(57) ABSTRACT

A torque tool for generating a predetermined torque, and a method of operating the same are disclosed. A driver is connected, via a thermal fuse, to a motor and receives a power signal from an electrical power source. The thermal fuse stops power to the driver under prolonged supply of power to the driver. A comparator, receiving the power signal and a reference signal, is coupled to a solid-state switch operable based on a fault signal that is generated by the comparator. The solid-state switch is connected to the driver and the electrical power source in series with the thermal fuse to rapidly stop power to the driver in response to the voltage level of the power signal falling below a threshold voltage without the thermal fuse stopping the power signal.

20 Claims, 8 Drawing Sheets

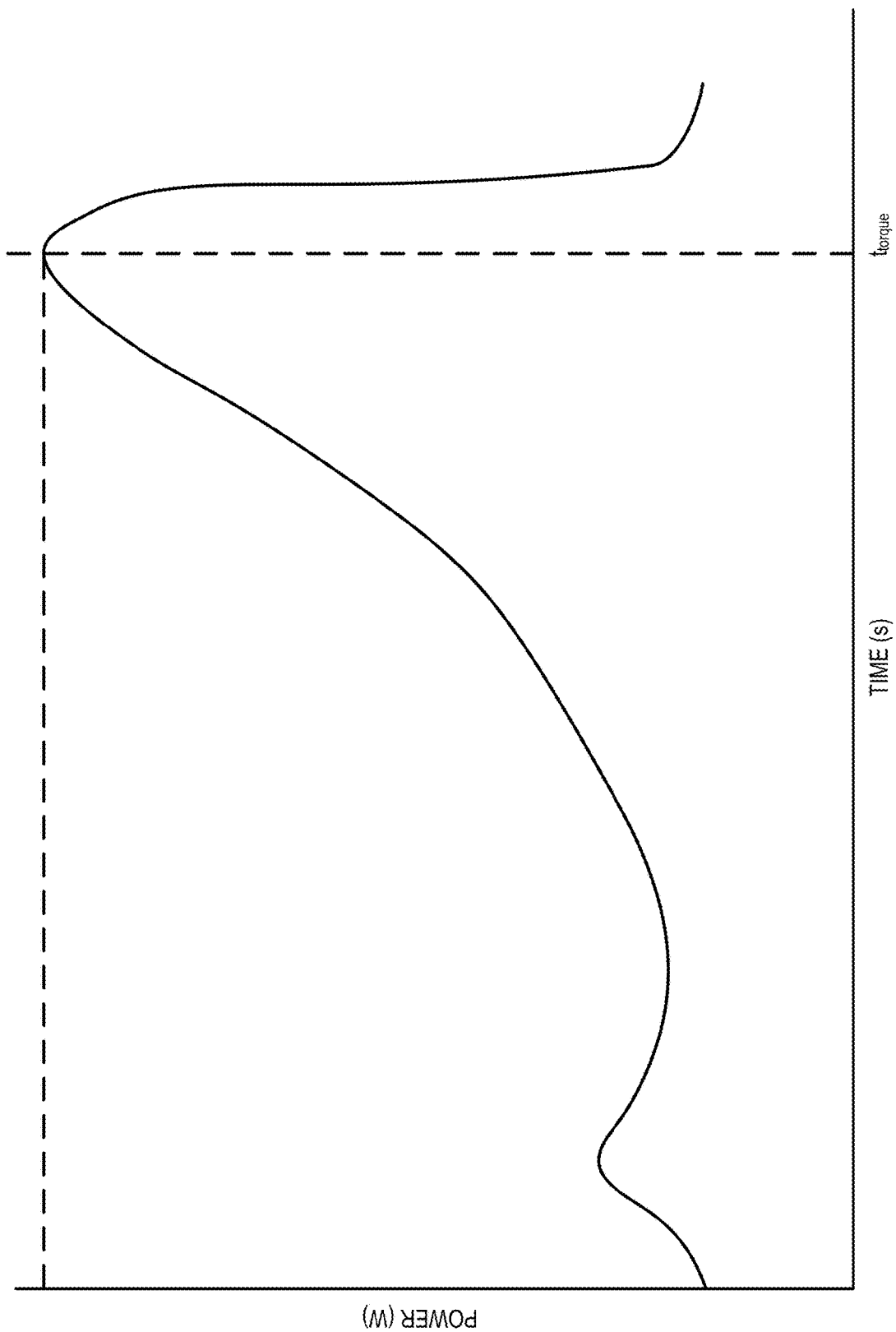

TORQUE TOOL WITH FAULT PROTECTION AND A METHOD OF OPERATING THE SAME

TECHNICAL FIELD

The disclosure relates generally to torque tools, and more particularly to torque tools with fault protection.

BACKGROUND

Motors are driven are commonly driven using MOSFET-based motor drivers. For example, in a common configuration, one or more high-side MOSFETs and one or more low-side MOSFETs are provided. Sequential switching of such high and low side MOSFETs is used to drive the motor. Such motor drivers have various failure modes. MOSFETs can fail if they are subjected to voltage levels beyond their rated maximum or minimum levels, which may occur happen if the power supply voltage is too high or too low, or if there is a voltage spike or transient. MOSFETs can also fail if they are subjected to excessive current levels, which may happen if the motor is stalled or overloaded, or if there is a short circuit in the motor or wiring. MOSFETs generate heat when they switch on and off, leading to failure to overheating, which may occur due to inadequate heat rejection, or in an overcurrent situation. MOSFET-based motor drivers may fail due to electrostatic discharge, gate oxide breakdown, and/or electromagnetic interference.

In one failure, both the high-side and low-side MOSFETs are turned on simultaneously, which creates a short circuit between the positive and negative power supplies. This can happen if there is a fault in the control circuitry that results in both MOSFETs being turned on at the same time, or if there is a short circuit in the MOSFETs themselves. When this failure mode occurs, the power flowing through the MOSFETs can rapidly increase to extremely high levels (due to high current, up to 300 A or more), which can cause the MOSFETs to overheat, fail, or even explode. In addition, the power can cause damage to other components in the motor driver circuit, such as the gate drivers, power supplies, or microcontroller. Such a failure mode may be referred to as "shoot-through" or "cross-conduction" failure.

To prevent this failure mode, MOSFET-based motor drivers are typically designed with protection features, such as dead-time insertion, which ensures that both MOSFETs cannot be turned on simultaneously. Dead-time insertion is achieved by inserting a small delay between the turn-off of one MOSFET and the turn-on of the other MOSFET, which ensures that both MOSFETs are not on at the same time. The delays may have a detrimental effect on performance and/or capabilities of the torque tool.

In general, thermal fuses are commonly used to prevent damage to electrical devices due to excessive power flow. A thermal fuse is a type of electrical safety device that is designed to protect electronic equipment and appliances from overheating and fire. It is usually a one-time-use device that operates like a fuse, but it is triggered by heat. A thermal fuse is formed of container filled with a special material that melts or breaks down when it reaches a certain temperature. While conducting electricity, the thermal fuse starts to heat up due to joule heating. When the temperature of the thermal fuse exceeds a specified limit, the thermal fuse activates and breaks the electrical circuit, which shuts off power to the device. Thermal fuses are configured to operate within a predefined operating range, which is specified in terms of an operating range for current and an operating range for voltage. Thermal fuses commonly have low predictability, e.g. the time duration needed to break a fuse at a given current and voltage may vary greatly and may be difficult to predict, poor accuracy with respect to operating envelope and temperature for interrupting power flow, and are relatively slow to respond to an overcurrent and/or overvoltage condition. Thermal fuses are relatively simple and inexpensive to manufacture and install. However, they are a one-time-use device and must be replaced if they are triggered.

For compliance with safety requirements and standards, torque tools are often overdesigned, i.e. motors and motor drivers are significantly more capable than required. As a result, safety considerations may lead to heavier, more expensive, and/or larger torque tools.

SUMMARY

In an aspect, the disclosure describes a torque tool for generating a predetermined torque. The torque tool also includes a driver electrically connected to receive a power signal from an electrical power source at a voltage level and a current level; a motor electrically connected to the driver to generate the predetermined torque in response to supplying the power signal to the driver such that the voltage level is at a first voltage and the current level is at a first current; a thermal fuse electrically disposed between the electrical power source and the driver and configured to stop the power signal to the driver under prolonged supply of the power signal to the driver, the current level during the prolonged supply being lower than the first current; and analog circuitry, defining a solid-state switch operable based on a fault signal and electrically disposed between the driver and the electrical power source in series with the thermal fuse to allow rapid stopping of the power signal to the driver, and a comparator coupled to the solid-state switch and configured to generate the fault signal based on the power signal and a predetermined reference signal to selectively operate the solid-state switch to rapidly stop the power signal to the driver in response to the voltage level falling below a threshold voltage lower than the first voltage to mitigate overcurrent without the thermal fuse stopping the power signal.

In an aspect, the disclosure describes a method of operating a torque tool for generating a predetermined torque. The method of operating also includes supplying a power signal from an electrical power source, at a voltage level and a current level, to a driver via a thermal fuse that is configured to stop the power signal to the driver under prolonged supply of the power signal to the driver, the current level during the prolonged supply being lower than a first current; driving a motor by the driver to generate a predetermined torque in response to supplying power signal to the driver such that the voltage level is at a first voltage and the current level is at a first current; generating a fault signal based on the power signal and a predetermined reference signal using a comparator; and operating a solid-state switch, electrically disposed between the driver and the electrical power source in series with the thermal fuse to allow rapid stopping of the power signal to the driver, based on the fault signal to rapidly stop the power signal to the driver in response to the voltage level falling below a threshold voltage lower than the first voltage to mitigate overcurrent without the thermal fuse stopping the power signal.

In an aspect, the disclosure describes a torque tool for generating a predetermined torque. The torque tool also includes a driver electrically connected to receive a power signal from an electrical power source at a voltage level and a current level; a motor electrically connected to the driver to generate the predetermined torque in response to supplying the power signal to the driver such that the voltage level is at a first voltage and the current level is at a first current; a thermal fuse electrically disposed between the electrical power source and the driver and configured to stop the power signal to the driver under prolonged supply of the power signal to the driver, the current level during the prolonged supply being lower than the first current, the thermal fuse being configured to stop the power signal to the driver in response to supply of the power signal to the driver for at least one second while the current level is lower than the first current; and digital circuitry configured to receive the power signal and electrically connected to the driver to control the motor based on the power signal; and analog circuitry configured to stop the power signal to the driver within ten microsecond of the voltage level falling below a first threshold voltage lower than the first voltage, defining an analog low-pass filter defined by a resistor and a capacitor to filter the power signal to generate a filtered power signal, a first solid-state switch operable based on a fault signal and electrically disposed between the driver and the electrical power source in series with the thermal fuse to allow rapid stopping of the power signal to the driver, a comparator coupled to the first solid-state switch and configured to generate the fault signal based on the filtered power signal and a predetermined reference signal to selectively operate the first solid-state switch to rapidly stop the power signal to the driver in response to the voltage level falling below the first threshold voltage to mitigate overcurrent without the thermal fuse stopping the power signal, and a second solid-state switch operable based on a digital fault signal generated by the digital circuitry in response to the voltage level being below a second threshold voltage lower than the first voltage and higher than the first threshold voltage while the current level is above the first current.

Embodiments can include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 4A is a schematic representation of the time evolution of a power level of a power signal, in accordance with an embodiment;

DETAILED DESCRIPTION

The following disclosure relates to torque tools with fault protection systems. In some embodiments, the devices and methods disclosed herein can enable lighter and more compact torque tools, as well as facilitate safer operation of torque tools at lower cost and complexity.

Aspects of various embodiments are described in relation to the figures.

In regular operation of the torque tool, e.g. to tighten a bolt, the power supplied to the motor increases the torque applied until a predetermined torque, associated with a predetermined peak power (and current), is achieved. The predetermined torque may be a torque associated with the torque tool or may be selectable. Once this predetermined torque is achieved, the torque tool rapidly unloads the bolt to avoid overtightening. As such, there is no sustained application of torque at or close to the predetermined torque. It is found advantageous that torque tool may be configured so that the predetermined torque is such that the predetermined peak power (or current) is higher than a rated operating power (or current) of the motor 122. This allows for more compact motors, greater range, lower weight, and lower costs. However, it was found that risks such as risk of thermal damage, and risk of fire, sparks, ignition, and smoke increases.

It is found that a particularly common failure mode in torque tools is cross-conduction or shoot-through. Risks are ameliorated by use of fast switches operated by fast electronics to cut off power to the driver if the power level reaches higher than the predetermined peak power.

Figure 1:
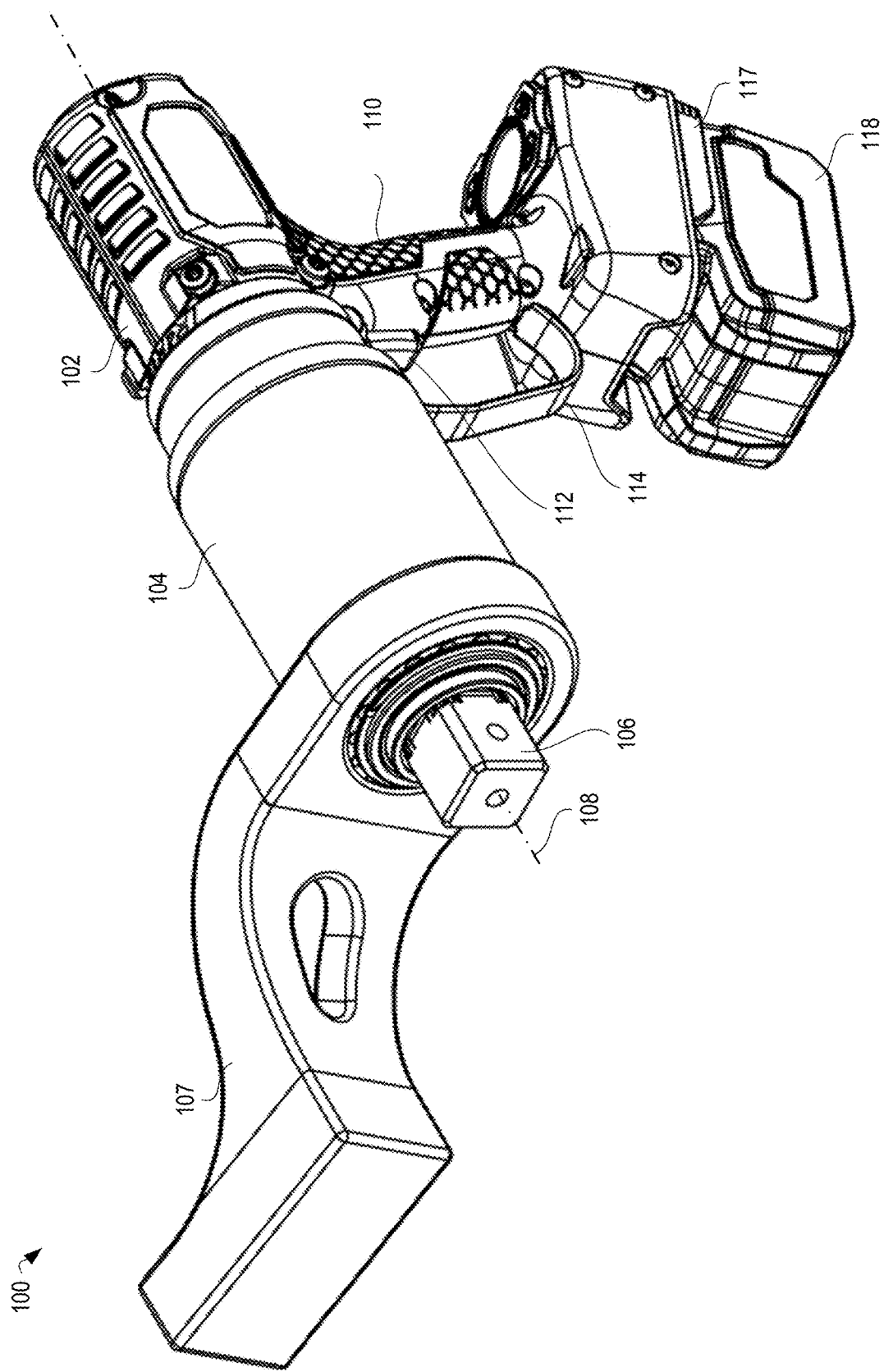
FIG. 1 is a perspective view of an exemplary geared torque tool.

FIG. 1 is a perspective view of an exemplary geared torque tool 100.

The torque tool 100 comprises an electrical motor 102 defining a rotor and stator. The motor 102 is securably housed within an exterior housing assembly or handle assembly of the torque tool 100. It is understood that, in some embodiments, an exterior housing assembly 102 may be free of handle(s). For example, the torque tool 100 may be remotely controlled with a pendant.

For example, the motor 102 may be a brushless direct current (DC) electrical motor that may be powered via one or more batteries. It is understood that, in some embodiments, other types of motors may be suitable in certain applications.

The motor 102 is coupled to a geartrain of a gearbox 104 to form a drive assembly terminating in an output shaft 106. The drive assembly enables torque transmission and allows supporting of the gearbox 104 during such torque transmission. The motor 102 and the gearbox 104 may be arranged generally in sequence, axially adjacent to each other (relative to a longitudinal axis 108 defining an axis of rotation of the rotor), and/or non-overlapping with (or at least partially nested within) each other.

The output shaft 106 extends axially outwardly from the gearbox 104 distal from the motor 102. The output shaft 106 is operable by the motor via the gearbox 104 so as to cause the output shaft 106 to rotate about the longitudinal axis 108. The output shaft 106 may define, or be suitable to couple with a tool head defining, a mating adapter or spindle for mating with a workpiece, e.g. a threaded fastener, to allow rotation thereof by the torque tool 100.

In various embodiments, a user trigger 112 may be mounted on a handle 110 of the torque tool 100 or proximal thereto so as to allow the operator to operate the torque tool 100. In various embodiments, the exterior housing assembly may further comprise a trigger guard 114 for preventing accidental engagement of the user trigger 112.

In some embodiments, electronic circuitry 117, e.g. including controllers and/or other digital and/or analog circuitry, may be housed at least partially within or between the two opposite portions of the exterior housing assembly, e.g. securably sandwiched therebetween or disposed in a pocket formed therebetween. In various embodiments, the electronic circuitry 117 may be housed at an end of the handle 110 distal from the motor 102. Advantageously, in some embodiments, a portion of the electronic circuitry 117 (e.g. a housing thereof) may form a lower terminal end of the exterior housing assembly. It is understood that additional or alternative electronic circuitry may be provided at other locations within the torque tool 100, such as on printed circuit boards (PCBs) mounted adjacent to the motor 102 of the torque tool 100.

A battery 118 may be engaged with the torque tool 100. The battery 118 may be an electrical power source for the torque tool 100 so as to facilitate portability and allow wireless operation of the torque tool 100. In various embodiments, the battery 118 may directly engage with the electronic circuitry 117 and may be wholly disposed adjacent thereto. For example, the electronic circuitry 117 may be configured for fault protection. It is understood that battery 118 may refer to one or more batteries, each defining one or more cells. One or more batteries defining the battery 118 may be connected to the motor 102 for powering the motor 102. For example, a dual battery may include two batteries acting cooperatively to power the motor 102. It is understood that, in some embodiments, an electrical power source other than a battery 118 may be used. For example, the torque tool 100 may include a wire allowing electrical connection to an electrical socket to supply AC power.

In various embodiments, the exterior housing assembly may at least partially be formed of plastic, e.g. the portions of the exterior housing assembly may be injection molded plastic parts.

The drive assembly of the torque tool 100 may be adapted to rigidly couple to an end of an external reaction arm 107, e.g. by frictional engagement or fastening engagement of a ring of the gearbox 104 with a slot on the reaction arm 107 that is complementary to the ring. For example, the reaction arm 107 may be a metal bar or other rigid component. Another end of the reaction arm 107 may be rigidly coupled to or attached to a non-moving structure to allow rotation of the output shaft 106. It is understood that a reaction arm 107 may not be provided in some embodiments.

Figure 2:
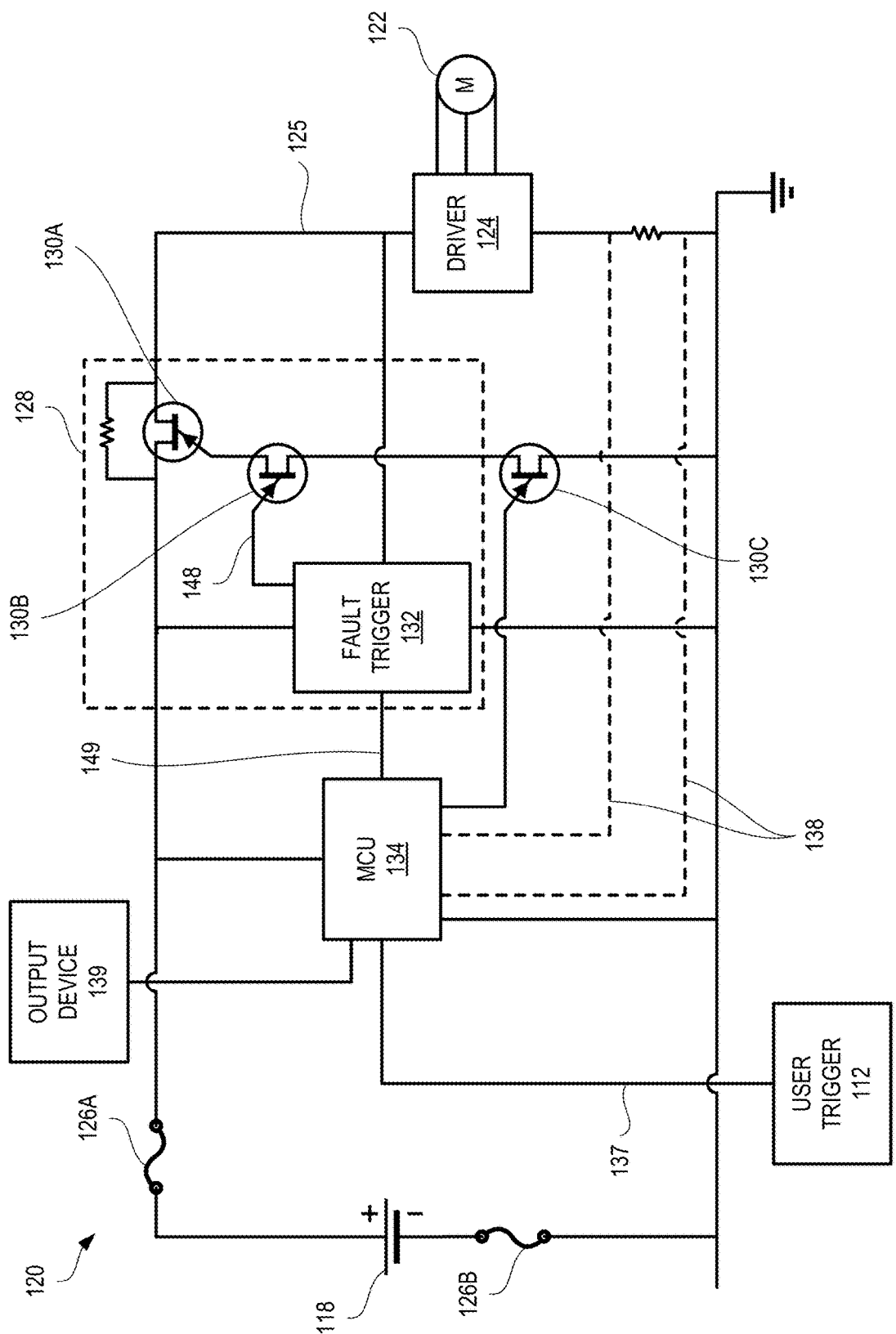
FIG. 2 is a schematic diagram of fault protection circuitry of the torque tool, in accordance with an embodiment.

FIG. 2 is a schematic diagram of fault protection circuitry 120 of the torque tool 100, in accordance with an embodiment.

The torque tool 100 is configured to generate a predetermined torque. For example, such a torque may be selectable by a user operating the torque tool 100. The predetermined torque is associated with a peak current, which may be associated with a peak power, received by a driver 124. The driver 124 is electrically connected to a motor 122 of the torque tool 100 to generate the predetermined torque. The driver 124 is electrically connected to receive a power signal 125 from the battery 118 at a current level and a voltage level. The current level and voltage level define a power level. The current level and the voltage level may vary depending on switching of the driver 124. In normal operation, the driver 124 may cause increase of the current level until the peak current is achieved, and may thereafter rapidly decrease the current level. As the current level increases, the voltage level may decrease, while the power level increases.

The behaviour of the driver 124 may be controlled by a controller or other circuitry. In some embodiments, the driver 124 may be controlled in a feedforward manner or in a feedback manner. In some embodiments, the driver 124 may increase current to a predetermined current to achieve the predetermined torque, e.g. such a predetermined current may be specified or determined based on a model of the electric motor and components connected thereto. In some embodiments, the driver 124 may increase the current level based on a measured current, torque, rotation rate, strain rate, and/or other observable indicative of the torque, so as to achieve the predetermined torque.

The circuitry 120 may further include analog circuitry 128 and one or more thermal fuses 126A, 126B electrically disposed between the battery 118 and the driver 124. The analog circuitry 128 defines a solid-state switch 130A electrically disposed between the driver and the battery 118, in series with the thermal fuses 126A, 126B, to allow rapid stopping of the power signal 125 to the driver 124 by operation of the switch 130A. For example, the switch 130A may be a metal oxide field effect transistor (MOSFET) that is configured to rapidly stop and/or supply the power signal 125 to the driver 124 based on a gate input voltage to the MOSFET. The thermal fuses 126A, 126B may individually and/or in combination may be selected to comply with safety standards applicable to torque tools, e.g. IEC standard no. 62841-1-2014, the contents of which are incorporated herein by reference.

As referred to herein, solid-state switches may refer to transistor-based switches that can allow suitable power transmission, are operable via a relatively small current signal, and allow rapid connection or disconnection of a source gate to a drain gate. Transistor-based switches may include MOSFETs, Insulated Gate Bipolar Transistors (IGBTs), and Bipolar Junction Transistors (BJTs). The solid-state switch 130A may be high-power switch, such as a MOSFET or IGBT.

The analog circuitry 128 also defines a fault trigger 132 that is operably connected to a solid-state switch 130B, e.g. to supply gate voltage inputs to MOSFETs. In various embodiments, the fault trigger 132 may be an analog trigger formed substantially without any digital circuitry to avoid analog to digital conversions, which may introduce unacceptable delays in the fault protection system. The fault trigger 132 may be configured to operate the solid-state switch 130B based on the power signal 125 to prevent overcurrent to the driver 124. In various embodiments, operation of the solid-state switch 130B may operate the solid-state switch 130A. In some embodiments, the fault trigger 132 may be connected directly to the solid-state switch 130A without an intermediate connection through the solid-state switch 130B.

The fault trigger 132 may generate a fault signal 148. The solid-state switch 130B is operable based on the fault signal 148 to allow rapid stopping of the power signal 125 to the driver 124. In some embodiments, the fault signal 148 may be a binary signal, such as a high or low voltage. For example, a low voltage may be indicative of no fault detection and a high voltage may be indicative of detection of fault.

In the embodiment of FIG. 2, the solid-state switches 130A is controlled by series-connected solid-state switches 130B, 130C, connected in series. The solid-state switch 130C may be operated by a main control unit or MCU 134 (or a controller forming part thereof) electrically connected thereto. For example, in some embodiments, upon opening of any one of the solid-state switches 130A, 130B, 130C, electrical power supplied to the driver 124 may be cut off.

The MCU 134 may be connected to the fault trigger 132. In some embodiments, the MCU 134 may define a controller that is connected to the driver 124 to control the power or current supplied to the motor 122 by the driver 124. The controller may be configured to receive the power signal 125 and may be electrically connected to the driver 124 to control the motor 122 based on the power signal 125 to generate the predetermined torque.

In some embodiments, the MCU 134 may be configured to determine a current associated with the driver 124 by using electrical connections 138. In some embodiments, current supplied to the driver 124 may be monitored using current monitoring lines 138. In various embodiments, the MCU 134 may be configured to control the motor 122 via the driver 124 based on a sensed torque generated by the motor 122. In various embodiments, the MCU 134 may comprise digital circuitry, such as one or more digital microprocessors.

In various embodiments, the user trigger 112 may be connected to the MCU 134. The user trigger 112 may be operable to generate a user input signal 137. The MCU 134 may be configured to receive the user input signal 137. During normal operation, the MCU 134 may be configured to control the motor 122 based on the user input signal 137 to generate the predetermined torque using the power signal when the fault signal 149 indicates that there is no fault condition. When the fault signal indicates that there is a fault, the MCU 134 may cause avoiding or stopping of supplying power to the driver 124. Instead, the MCU 134 may generate an output signal to supply to an output device 139, such as display device, a speaker, or an LED light. In some embodiments, a display device may generate a user message based on the output signal. For example, advantageously, the user message may be descriptive. Example user messages may include a warning to the user that may include instructions, hints, or tips regarding safe operation of the torque tool 100, including replacement and/or removal of the battery 118.

Figure 3:
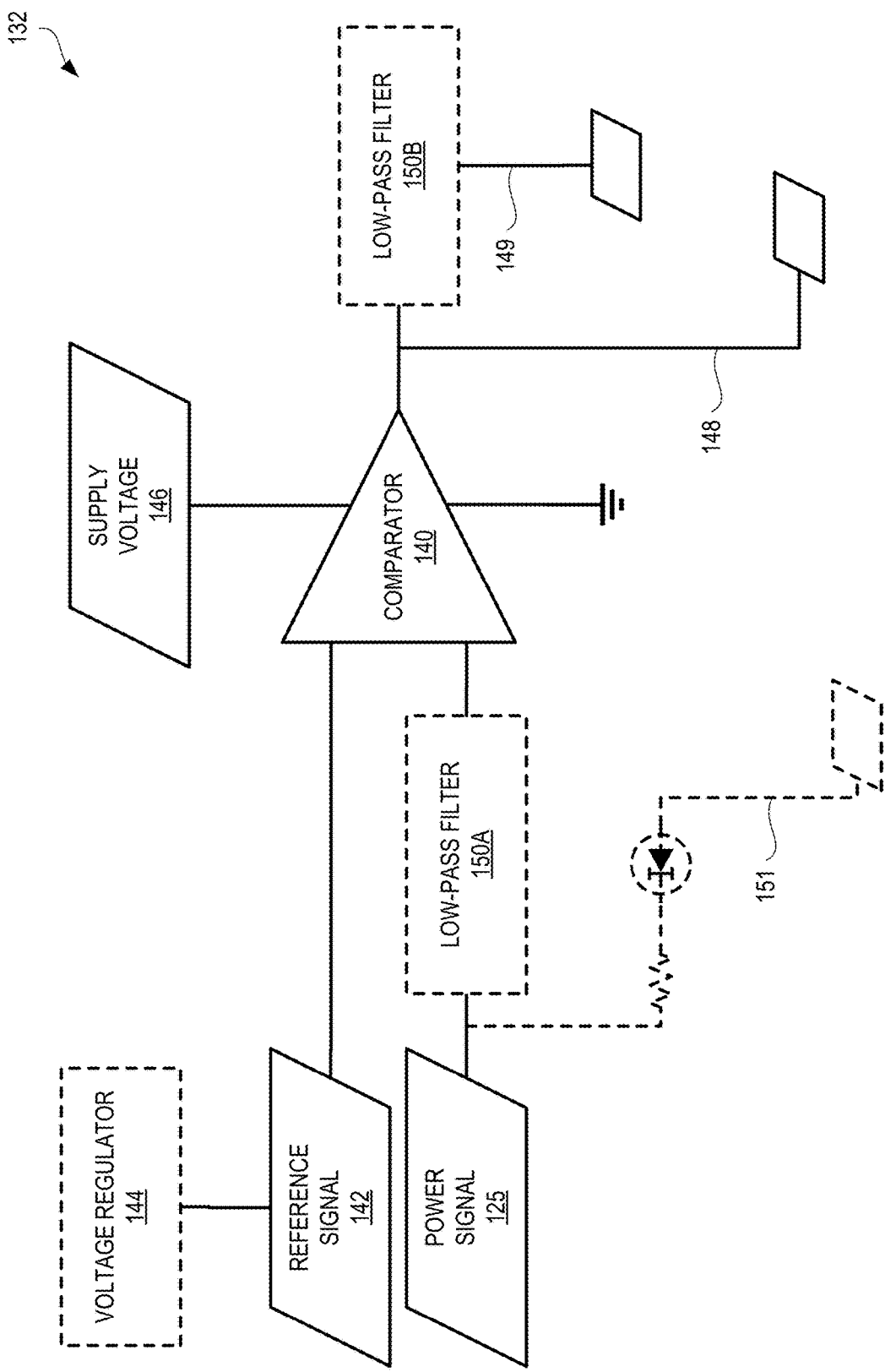
FIG. 3 is a schematic block diagram of a fault trigger of the fault protection circuitry, in accordance with an embodiment.

FIG. 3 is a schematic block diagram of the fault trigger 132, in accordance with an embodiment.

The fault trigger includes a comparator 140, which is connected to the solid-state switch 130B. The comparator 140 is configured to receive a predetermined reference signal 142 and the power signal 125, and is powered by a supply voltage 146 (or supply rail voltage). In some embodiments, the reference signal 142 is generated by a voltage regulator 144. In some embodiments, the reference signal 142 may be a signal may be a 5V reference signal. The comparator 140 generates the fault signal 148 as output by comparing the reference signal 142 and the power signal 125. The comparator 140 is configured to generate the fault signal 148 based on the power signal and the predetermined reference signal to selectively operate the solid-state switch 130B.

In some embodiments, the power signal 125 is filtered through a low-pass filter 150A before being supplied to the comparator 140 as a filtered power signal. The low-pass filter 150A may have a cutoff frequency of between 100 and 500 kHz, or about 160 kHz. Advantageously, such a cutoff frequency may allow sufficiently fast operation of the solid-state switch 130B to mitigate risks such as risk of fire and/or thermal damage, while mitigating excessive switching due to high frequency noise as this could lead to component failure or undesirable motor behaviour.

In some embodiments, an output of the comparator 140 is filtered through another low-pass filter 150B before being supplied to the MCU 134. In contrast, the solid-state switch 130B may receive an unfiltered output of the comparator 140. Advantageously, this may allow fast operation of the solid-state switch 130B to mitigate risks such as risk of fire and/or thermal damage.

In some embodiments, the low-pass filter 150B may have a cutoff frequency of between 200 and 300 Hz, or about 265 Hz.

The filtered fault signal 149 may be supplied to the MCU 134. The MCU 134 may be configured to control the motor 122 based on the user input signal 137 to generate the predetermined torque using the power signal when the filtered fault signal 149 is indicative of the voltage level being higher than a threshold voltage.

The low-pass filters 150A, 150B may be analog filters, such as low-pass filters implemented using one or more resistors and one or more capacitors, and as such may allow faster processing, e.g. these may not require digital-to-analog converters. In some embodiment, inductors may also be used.

It is understood that, in various embodiments, other components may be provided in the fault trigger 132.

A resistor and diode, as shown in FIG. 3, may be provided to supply an output to provide grounding when there is a short circuit fault.

FIG. 4A is a schematic representation of the time evolution of the power level of the power signal 125, in accordance with an embodiment.

The power of the power signal 125 increases up to a peak power. The peak power is achieved when the predetermined torque is achieved. As such, the power rapidly drops off thereafter to avoid continuing to apply torque. The peak power may be achieved at a time $t_{torque}$.

Start up behaviour of the motor 122 and/or drive 124 may lead to start up behaviour, such as a stationary point as shown in FIG. 4A, which is normally much lower than the peak power. After completion of start up, the power may increase monotonically until the peak power at $t_{torque}$ is achieved.

Figure 4B:
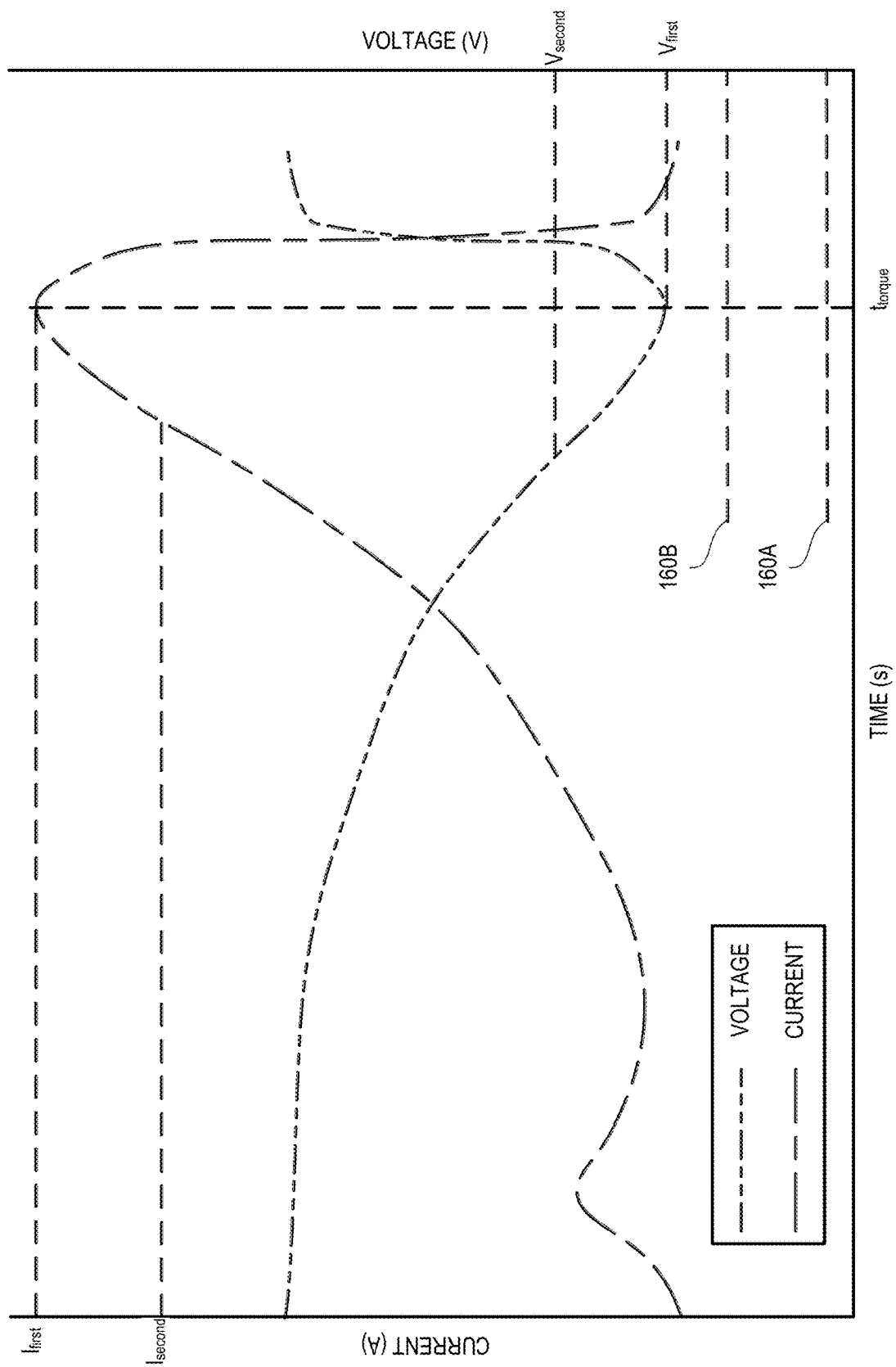
FIG. 4B is a schematic representation of the time evolution of current and voltage levels of the power signal, in accordance with an embodiment.

FIG. 4B is a schematic representation of the time evolution of current and voltage levels of the power signal 125, in accordance with an embodiment.

The current supplied to the motor 122 increases till a first current $I_{first}$ is achieved. The first current may be a peak current or, during a normal operation of the torque tool 100, a maximum current received by the driver 124, at least until a succeeding torquing cycle. Simultaneously, the voltage level decreases from an initial voltage till a first voltage $V_{first}$, which may be a trough voltage or, during normal operation of the torque tool 100, a minimum voltage. The initial voltage may be determined by the battery characteristics.

The first voltage may be associated with the first current such that the motor 122 generates the predetermined torque when the power signal 125, supplied to the driver 124, is such that the voltage level is at the first voltage and the current level is at the first current.

The thermal fuses 126A, 126B may be configured to be operational within an operational envelope, defined by a current range. In some instances, a voltage range may also be specified. When operated within the operational envelope, the thermal fuses 126A, 126B may operate as intended: heating (such as Joule heating) raises the temperature of the fuse(s) 126A, 126B relatively slowly so as to eventually activate one or more of the fuses(s) 126A, 126B to eventually break the circuit. Operating the thermal fuses 126A, 126B outside their operational envelopes may cause unpredictable behaviour. The operational envelope includes the first current and the first voltage. As such, at least one of the thermal fuses 126A, 126B may be configured to stop the power signal 125 to the driver 124 under prolonged supply of the power signal 125 to the driver 124 at the first current and the first voltage. Additionally, in various embodiments, the operational envelope may extend to a second current $I_{second}$ lower than the first current. For the torque tool 100, this second current may be associated with a second voltage $V_{second}$ that is higher than the first voltage. As such, at least one of the thermal fuses 126A, 126B may be configured to stop the power signal 125 to the driver 124 under prolonged supply of the power signal 125 to the driver 124 such that the current level during the prolonged supply is between the first and second current. The voltage level during the prolonged supply may be between the first and second voltages.

It is understood that the operational envelope may include currents higher than the first current. However, in order to ensure the thermal fuses are activated in time to protect the driver 124, the thermal fuses may have relatively narrow operational envelopes. Thermal fuses with accurate and predictable performance may be difficult and expensive to manufacture. As such, it is found advantageous to use thermal fuses with a safety factor.

The motor 122 may be designed for substantially prolonged or continual operation at a rated operating power, or current or voltage, which may be specified in terms of current and voltage. The rated operating power, or current or voltage, specifies the maximum loading of the motor and takes into account a service factor, which may be determined based on a variety of factors such as power dissipation characteristics of the motor, mechanical fatigue on motor components, thermal performance of materials of motor parts, and heat rejection performance. In some embodiments, the second current and/or the second voltage may define the rated (or maximum), respectively, operating current and/or voltage of the motor 122.

In regular operation of the torque tool 100, e.g. to tighten a bolt, the torque applied increases until a predetermined torque is achieved, as suggested by FIGS. 4A-4B. Once this predetermined torque is achieved, the torque tool 100 rapidly unloads the bolt to avoid overtightening. As such, there is no sustained application of torque at substantially the predetermined torque. It is found advantageous that the torque tool 100 be configured so that peak current (or power) is higher than the rated operating current (or power) of the motor 122. It is also found advantageous for the other electronic components, e.g. printed circuit board components, traces, wiring, to be designed with for lower currents. This allows for more compact motors and electronics, greater operational range, lower weight, and lower costs. However, risks such as the risk of fire and/or thermal damage may increase significantly.

While the motor 122 may be driven in over-rated manner for brief periods of time, prolonged operation of the motor 122 above its rated current and/or power may reduce efficiency and motor life. Additionally, the risk of motor or driver failure may increase. As such, at least one of the thermal fuses 126A, 126B may be configured to reliably stop the power signal 125 to the driver 124 under prolonged supply of the power signal 125 to the driver 124 above the rated power.

Nonetheless, the thermal fuses 126A, 126B may be insufficient to mitigate all significant risks. If there is a short circuit in the driver 124, the current may increase rapidly in the circuit. In the overcurrent condition, electronic components, particularly printed circuit board traces, may heat up and cause a drop in current in the circuit due to an increase in resistance. This is particularly true when the electronic components are under-designed. The thermal fuses 126A, 126B may not be activated during the relatively brief overcurrent condition and may continue not to be activated thereafter due to the smaller current after the electronic components sustain resistance-altering damage. Nevertheless, the electronic components may continue heating up and a risk of fire and further thermal damage may remain elevated.

Operating the motor in an over-rated manner reduces the margin to overcurrent in the circuit, e.g. overcurrent caused by a short circuit. As such, risks such as the risk of fire and/or thermal damage increases and becomes more immediate. For example, in some embodiments, fire and smoke may be caused when a current increases to a current level where the associated voltage level is 5V. Thermal fuses may be activated by joule heating and therefore require time to be activated. As such, thermal fuses may not be effective at mitigating risks associated with a short circuit condition.

The increased risk is ameliorated by use of fast switches operated by fast electronics to cut off power to the driver 124 if the voltage level reaches a first threshold voltage 160A, which is lower than the first voltage and which may be indicative of a current associated with a fault condition, such as a short circuit.

In particular, comparator 140 configured to generate the fault signal 148 based on the power signal 125 and a predetermined reference signal 142 to selectively operate the solid-state switch 130B to rapidly stop the power signal 125 to the driver 124 in response to the voltage level falling below the first threshold voltage 160A to mitigate overcurrent without the thermal fuses 126A, 126B stopping the power signal 125.

The first threshold voltage 160A may be determined based on the characteristic duration for generating the fault signal 148 in response to the power signal 125 and a typical or worst-case current/voltage/power curve behaviour in the event of a failure, e.g. time period between a fault occurring and reaching the current/voltage/power associated with smoke or fire.

The use of solid-state switches and analog electronics for fast switching is important because a slower response, e.g. associated with the use of digital electronics requiring digital-to-analog conversion (or vice-versa) or with thermal fuses, may not be sufficient to avoid smoke and fire. In some embodiments, at least one of the thermal fuses 126A, 126B is configured to stop the power signal 125 to the driver 124 in response to supply of the power signal 125 to the driver 124 for at least one second while the current level is lower than the first current (or about the same as the first current), and higher than the second current, whereas the analog circuitry 128 is configured to stop the power signal 125 to the driver 124 within about ten microseconds of the voltage level falling below the first threshold voltage 160A.

In various embodiments, the digital circuitry of the MCU 134 may be configured to receive the power signal 125. The solid-state switch 130C may be operable based on a digital fault signal generated by the digital circuitry in response to the voltage level being below a second threshold voltage 160B while the current level is above the first current. The second threshold voltage 160B may be lower than the first voltage and higher than the first threshold voltage 160A. The second threshold voltage 160B may be determined based on a characteristic duration of analog to digital conversion, e.g.

half a second, digital processing, and a typical or worst-case power curve behaviour in the event of a failure so as to ensure the digital fault signal is sent in time to avoid motor failure and/or fire and smoke. In the event of a failure of the digital circuitry to stop the power signal 125 to the driver 124, the fault trigger 132 generates the fault signal 148 to stop the power signal 125. Advantageously, this provides several layers of fault protection.

For example, the first threshold voltage 160A may be about 5 V and the second threshold voltage 160B may be about 12 V, while the first voltage may be about 14 V.

As referred to herein, the duration of prolonged operation may be at least as long as the characteristic response time of a thermal fuse.

Figure 5:
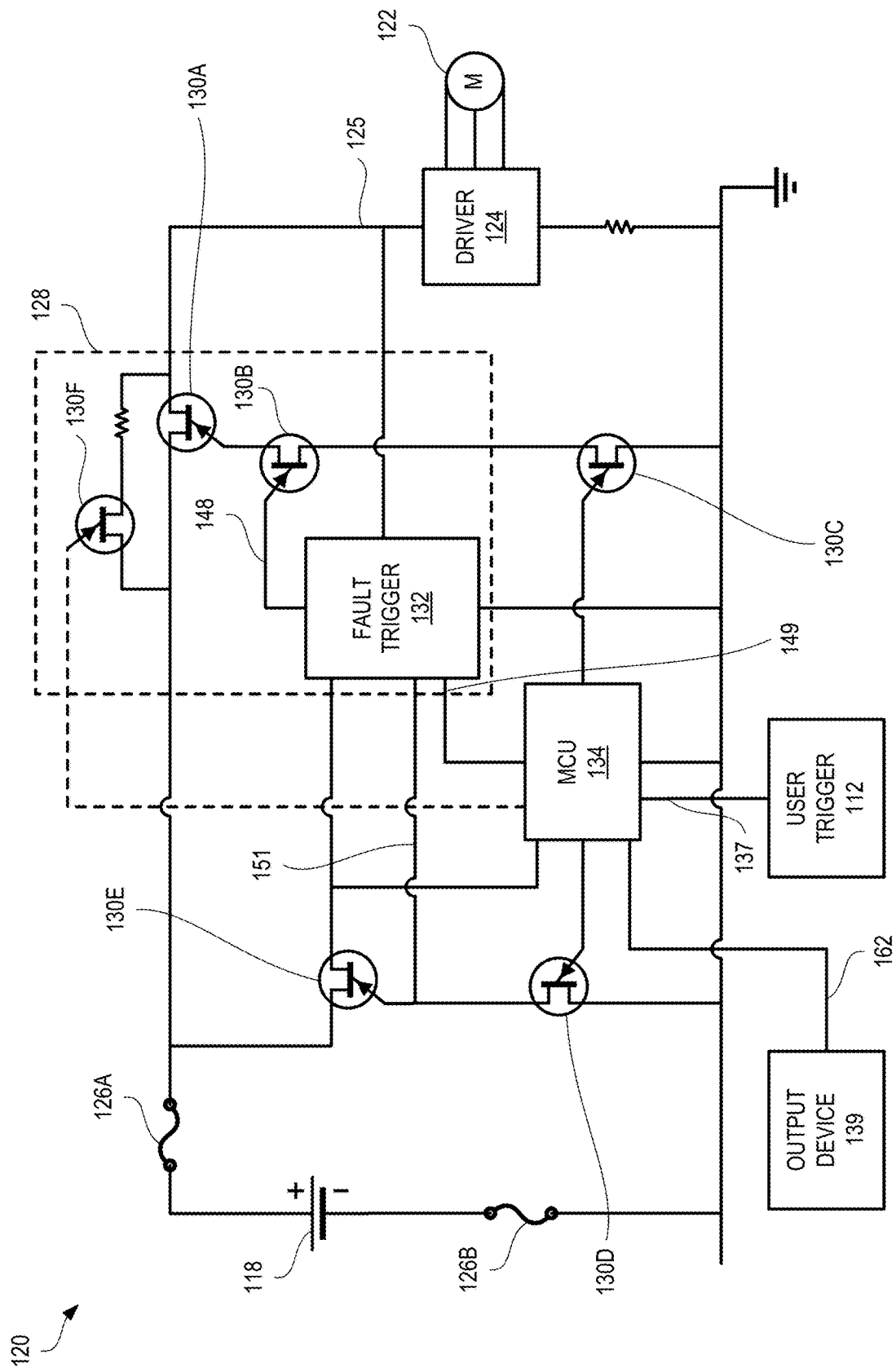
FIG. 5 is a schematic diagram of fault protection circuitry of the torque tool, in accordance with another embodiment.

FIG. 5 is a schematic diagram of fault protection circuitry 120 of the torque tool 100, in accordance with another embodiment.

In FIG. 5, the MCU 134 may be operably connected to a solid-state switch 130D, which may be connected to a solid-state switch 130E. The fault trigger 132 may be operably connected to the solid-state switch 130E to supply the signal 151 to the solid-state switch 130E. The user input signal 137 is generated by operation of the user trigger 112 and may be supplied to the MCU 134. In response, the MCU 134 may operate the solid-state switch 130D to close the switch 130E. In such a state, the battery 118 may be allowed to continue to supply power to the fault trigger 132 while a fault condition exists.

If the driver 124 is damaged, then upon restart of the torque tool 100, the voltage level to the driver 124 will continue to remain so low as to cause the fault trigger 132 to generate a fault signal 148 that stops power supply to the driver 124. In this case, the solid-state switch 130E receives signal 151 to allow turning on power supply to the MCU 134 and to the fault trigger 132 while stopping power supply to the driver 124. Advantageously, this may allow isolated operation of circuitry of the torque tool 100 and protect the user, as well as the torque tool 100.

In some embodiments, digital circuitry of the MCU 134 may be configured to generate an output signal 162 based on processing the fault signal while the fault signal is indicative of the existence of a fault condition and the user input signal indicating a user's desire turn on the device. The output device 139 may receive this output signal to generate a user warning based on the output signal. For example, a display device may indicate to the user that the torque tool and/or circuitry thereof is damaged, suggest replacing components, suggesting removing the battery to protect the battery, and/or suggest sending the tool to the manufacturer for repair.

In FIG. 5, the MCU 134 may further be operably connected to a solid-state switch 130F to cut-off power supply to the resistor to protect the resistor.

Figure 6:
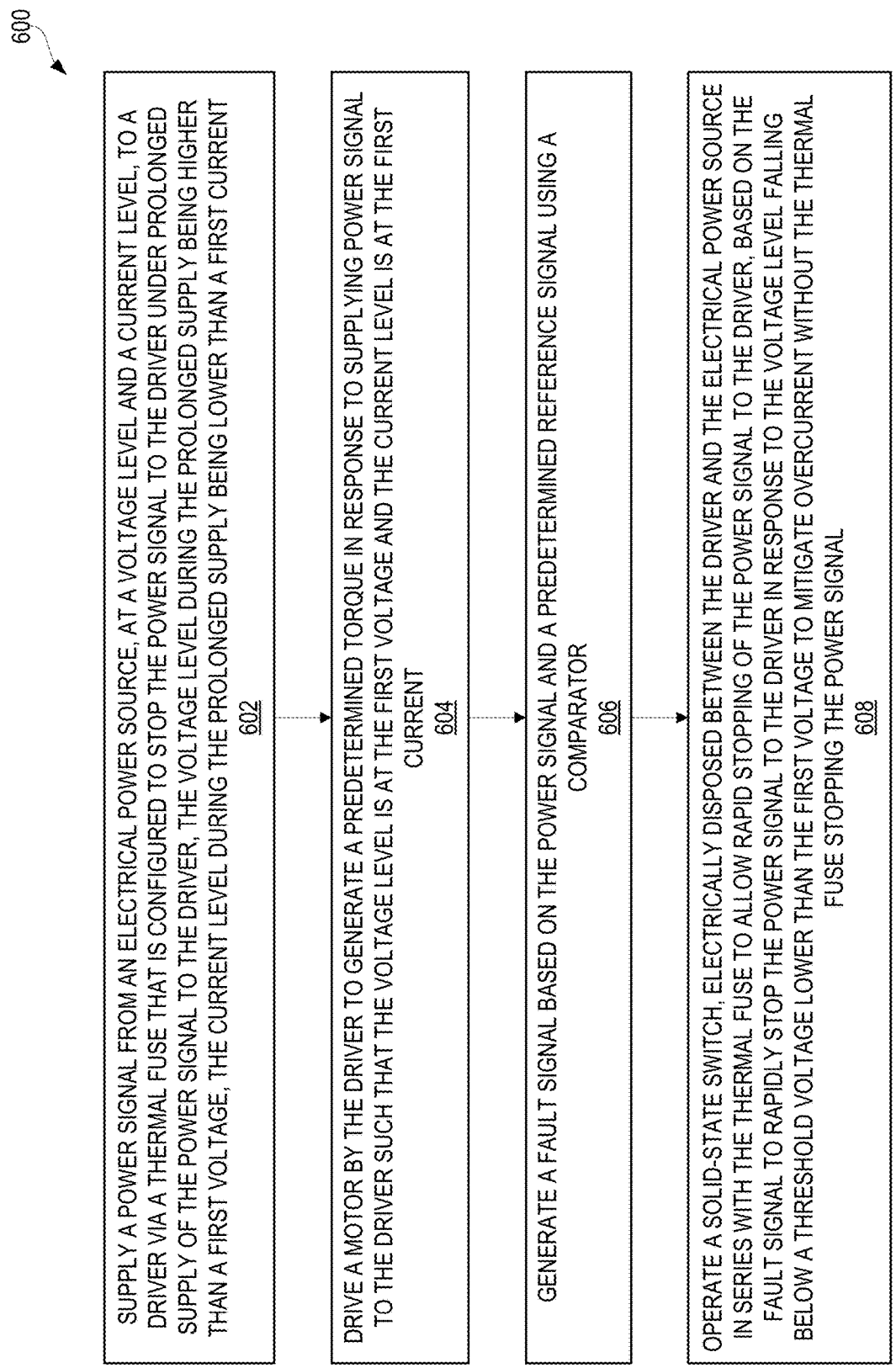
FIG. 6 is flowchart of an exemplary method of operating a torque tool for generating a predetermined torque.

FIG. 6 is flowchart of an exemplary method 600 of operating a torque tool for generating a predetermined torque.

Step 602 of the method 600 includes supplying a power signal from an electrical power source, at a voltage level and a current level, to a driver via a thermal fuse that is configured to stop the power signal to the driver under prolonged supply of the power signal to the driver, the voltage level during the prolonged supply being higher than a first voltage, the current level during the prolonged supply being lower than a first current.

Step 604 of the method 600 includes driving a motor by the driver to generate a predetermined torque in response to supplying power signal to the driver such that the voltage level is at the first voltage and the current level is at the first current.

Step 606 of the method 600 includes generating a fault signal based on the power signal and a predetermined reference signal using a comparator.

Step 608 of the method 600 includes operating a solid-state switch, electrically disposed between the driver and the electrical power source in series with the thermal fuse to allow rapid stopping of the power signal to the driver, based on the fault signal to rapidly stop the power signal to the driver in response to the voltage level falling below a threshold voltage lower than the first voltage to mitigate overcurrent without the thermal fuse stopping the power signal.

In some embodiments of the method 600, the solid-state switch is a metal-oxide-semiconductor field-effect transistor.

In some embodiments of the method 600, the threshold voltage is a first threshold voltage, the solid-state switch is a first solid-state switch. The method 600 may then further comprise operating a second solid-switch based on a digital fault signal generated by digital circuitry, configured to receive the power signal, in response to the voltage level being below a second threshold voltage lower than the first voltage and higher than the first threshold voltage while the current level is above the first current.

Some embodiments of the method 600 may further comprise supplying the power signal to a controller, electrically connected to the driver, to control the motor based on the power signal to generate the predetermined torque.

In some embodiments of the method 600, the solid-state switch and the comparator define analog circuitry, the thermal fuse is configured to stop the power signal to the driver in response to supply of the power signal to the driver for at least one second while the current level is lower than the first current (or about the same as the first current), and the analog circuitry is configured to stop the power signal to the driver within ten microseconds of the voltage level falling below the threshold voltage.

Some embodiments of the method 600 may further comprise filtering the power signal using an analog low-pass filter to generate a filtered power signal, the comparator being configured to receive the filtered power signal to generate the fault signal.

In some embodiments of the method 600, a cutoff frequency of the analog low-pass filter is greater than 100 kHz and 500 kHz.

Some embodiments of the method 600 may further comprise receiving a user input signal; processing the fault signal and the user input signal to generate an output signal based on the fault signal in response to the user input signal; and generating a user warning on a display device based on the output signal.

Figure 7:
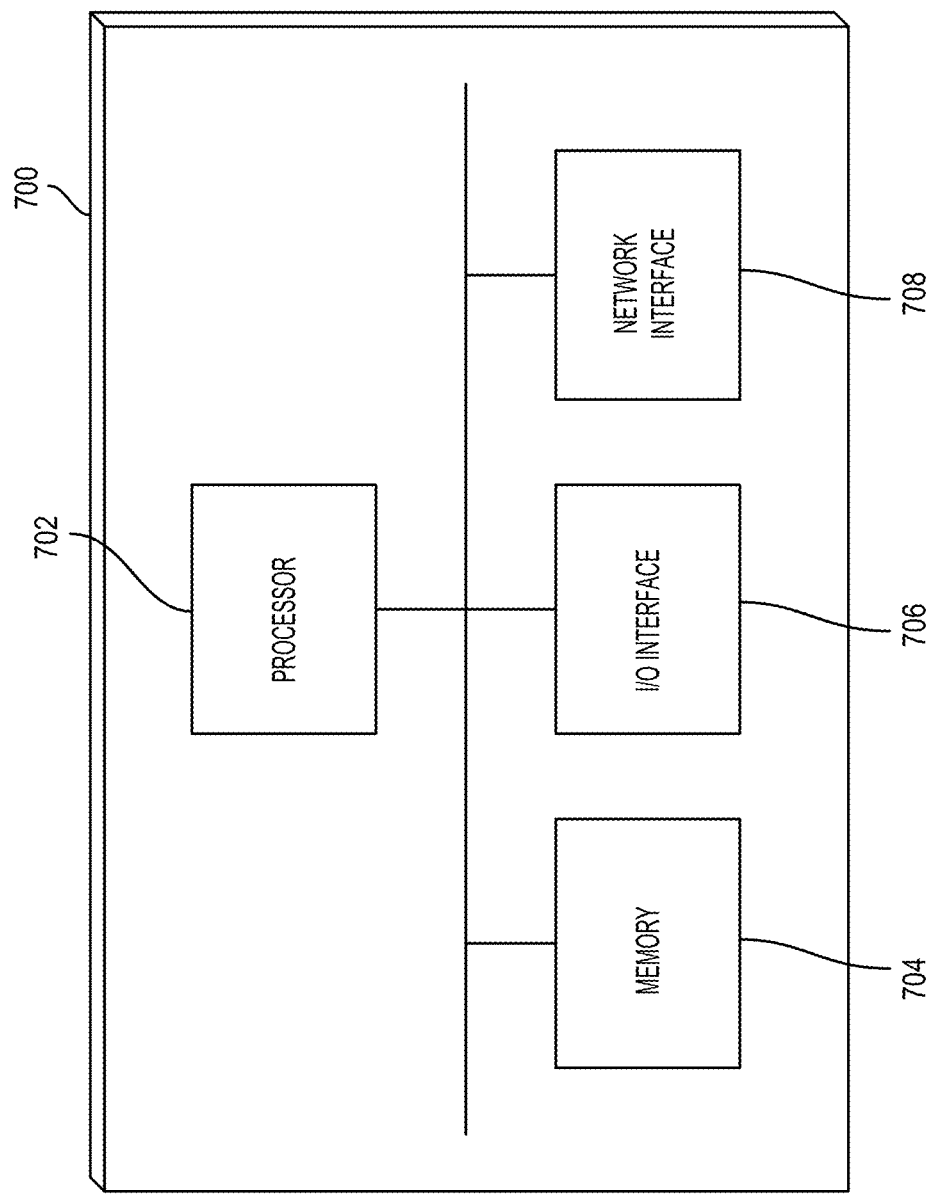
FIG. 7 illustrates a block diagram of a computing or processing device, in accordance with an embodiment.

FIG. 7 illustrates a block diagram of a computing or processing device 700, in accordance with an embodiment.

As an example, a portion or a combination of the output device 139, electronic circuitry 117, the MCU 134, a controller thereof, and/or digital circuitry thereof may be implemented using the example processing device 700 of FIG. 7.

The processing device 700 includes at least one processor 702, memory 704, at least one I/O interface 706, and/or at least one network communication interface 708.

The processor 702 may be a microprocessor or microcontroller, a digital signal processing (DSP) processor, an integrated circuit, a field programmable gate array (FPGA), a reconfigurable processor, a programmable read-only memory (PROM), or combinations thereof.

The memory 704 may include a machine-readable or computer-readable memory that is located either internally or externally such as, for example, random-access memory (RAM), read-only memory (ROM), electro-optical memory, magneto-optical memory, erasable programmable read-only memory (EPROM), electrically-erasable programmable read-only memory (EEPROM), and/or Ferroelectric RAM (FRAM).

The I/O interface 706 may enable the processing device 700 to interconnect with one or more input devices, such as a trigger, interface buttons and/or a touch screen positioned on the torque tool; a keyboard, mouse, camera, and/or a microphone; or with one or more output devices such as a display screen and/or a speaker.

The networking interface 708 may be configured to receive and transmit data.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the solid-state switches disclosed herein may be implemented using an Insulated Gate Bipolar Transistor (IGBT), only a single thermal fuse may be provided, two or more thermal fuses in series may be provided, and the electrical power source may be an AC power source. Yet further modifications could be implemented by a person of ordinary skill in the art in view of the present disclosure, which modifications would be within the scope of the present technology.

What is claimed is:

1. A torque tool for generating a predetermined torque, comprising:
    a driver electrically connected to receive a power signal from an electrical power source at a voltage level and a current level;
    a motor electrically connected to the driver to generate the predetermined torque in response to supplying the power signal to the driver such that the voltage level is at a first voltage and the current level is at a first current;
    a thermal fuse electrically disposed between the electrical power source and the driver and configured to stop the power signal to the driver under prolonged supply of the power signal to the driver, the current level during the prolonged supply being lower than the first current; and
    analog circuitry, defining
        a solid-state switch operable based on a fault signal and electrically disposed between the driver and the electrical power source in series with the thermal fuse to allow rapid stopping of the power signal to the driver, and
        a comparator coupled to the solid-state switch and configured to generate the fault signal based on the power signal and a predetermined reference signal to selectively operate the solid-state switch to rapidly stop the power signal to the driver in response to the voltage level falling below a threshold voltage lower than the first voltage to mitigate overcurrent without the thermal fuse stopping the power signal.

2. The torque tool of claim 1, wherein the solid-state switch is a metal-oxide-semiconductor field-effect transistor.

3. The torque tool of claim 1, wherein the threshold voltage is a first threshold voltage, the solid-state switch is a first solid-state switch, the torque tool further comprising:
    digital circuitry configured to receive the power signal; and
    a second solid-state switch operable based on a digital fault signal generated by the digital circuitry in response to the voltage level being below a second threshold voltage lower than the first voltage and higher than the first threshold voltage while the current level is above the first current.

4. The torque tool of claim 1, further comprising:
    a controller configured to receive the power signal and electrically connected to the driver to control the motor based on the power signal to generate the predetermined torque.

5. The torque tool of claim 1, wherein the thermal fuse is configured to stop the power signal to the driver in response to supply of the power signal to the driver for at least one second while the current level is lower than the first current, and the analog circuitry is configured to stop the power signal to the driver within ten microseconds of the voltage level falling below the threshold voltage.

6. The torque tool of claim 1, further comprising:
    an analog low-pass filter defined by a resistor and a capacitor to filter the power signal to generate a filtered power signal, the comparator being configured to receive the filtered power signal to generate the fault signal.

7. The torque tool of claim 6, wherein a cutoff frequency of the analog low-pass filter is between 100 kHz and 500 kHz.

8. The torque tool of claim 1, further comprising:
    a user trigger operable to generate a user input signal;
    digital circuitry configured to process the fault signal and the user input signal to generate an output signal based on the fault signal in response to the user input signal; and
    a display device configured to receive the output signal to generate a user warning based on the output signal.

9. The torque tool of claim 8, wherein the digital circuitry includes a controller electrically connected to the driver and configured to receive the power signal and the user input signal, the digital circuitry being configured to control the motor based on the user input signal to generate the predetermined torque using the power signal when the fault signal is indicative of the voltage level being higher than the threshold voltage.

10. A method of operating a torque tool for generating a predetermined torque, comprising:
    supplying a power signal from an electrical power source, at a voltage level and a current level, to a driver via a thermal fuse that is configured to stop the power signal to the driver under prolonged supply of the power signal to the driver, the voltage level during the prolonged supply being higher than a first voltage, the current level during the prolonged supply being lower than a first current;
    driving a motor by the driver to generate a predetermined torque in response to supplying power signal to the driver such that the voltage level is at the first voltage and the current level is at the first current;
    generating a fault signal based on the power signal and a predetermined reference signal using a comparator; and
    operating a solid-state switch, electrically disposed between the driver and the electrical power source in series with the thermal fuse to allow rapid stopping of the power signal to the driver, based on the fault signal to rapidly stop the power signal to the driver in response to the voltage level falling below a threshold voltage lower than the first voltage to mitigate overcurrent without the thermal fuse stopping the power signal.

11. The method of claim 10, wherein the solid-state switch is a metal-oxide-semiconductor field-effect transistor.

12. The method of claim 10, wherein the threshold voltage is a first threshold voltage, the solid-state switch is a first solid-state switch, the method further comprising:
operating a second solid-switch based on a digital fault signal generated by digital circuitry, configured to receive the power signal, in response to the voltage level being below a second threshold voltage lower than the first voltage and higher than the first threshold voltage while the current level is above the first current.

13. The method of claim 10, further comprising:
supplying the power signal to a controller, electrically connected to the driver, to control the motor based on the power signal to generate the predetermined torque.

14. The method of claim 10, wherein the solid-state switch and the comparator define analog circuitry, the thermal fuse is configured to stop the power signal to the driver in response to supply of the power signal to the driver for at least one second while the current level is lower than the first current, and the analog circuitry is configured to stop the power signal to the driver within ten microseconds of the voltage level falling below the threshold voltage.

15. The method of claim 10, further comprising:
filtering the power signal using an analog low-pass filter to generate a filtered power signal, the comparator being configured to receive the filtered power signal to generate the fault signal.

16. The method of claim 15, wherein a cutoff frequency of the analog low-pass filter is greater than 100 kHz and 500 kHz.

17. The method of claim 10, further comprising:
receiving a user input signal;
processing the fault signal and the user input signal to generate an output signal based on the fault signal in response to the user input signal; and
generating a user warning on a display device based on the output signal.

18. A torque tool for generating a predetermined torque, comprising:
a driver electrically connected to receive a power signal from an electrical power source at a voltage level and a current level;
a motor electrically connected to the driver to generate the predetermined torque in response to supplying the power signal to the driver such that the voltage level is at a first voltage and the current level is at a first current;
a thermal fuse electrically disposed between the electrical power source and the driver and configured to stop the power signal to the driver under prolonged supply of the power signal to the driver, the current level during the prolonged supply being lower than the first current, the thermal fuse being configured to stop the power signal to the driver in response to supply of the power signal to the driver for at least one second while the current level is lower than the first current; and
digital circuitry configured to receive the power signal and electrically connected to the driver to control the motor based on the power signal; and
analog circuitry configured to stop the power signal to the driver within ten microseconds of the voltage level falling below a first threshold voltage lower than the first voltage, defining
an analog low-pass filter defined by a resistor and a capacitor to filter the power signal to generate a filtered power signal,
a first solid-state switch operable based on a fault signal and electrically disposed between the driver and the electrical power source in series with the thermal fuse to allow rapid stopping of the power signal to the driver,
a comparator coupled to the first solid-state switch and configured to generate the fault signal based on the filtered power signal and a predetermined reference signal to selectively operate the first solid-state switch to rapidly stop the power signal to the driver in response to the voltage level falling below the first threshold voltage to mitigate overcurrent without the thermal fuse stopping the power signal, and
a second solid-state switch operable based on a digital fault signal generated by the digital circuitry in response to the voltage level being below a second threshold voltage lower than the first voltage and higher than the first threshold voltage while the current level is above the first current.

19. The torque tool of claim 18, wherein the first and second solid-state switches are metal-oxide-semiconductor field-effect transistors.

20. The torque tool of claim 18, wherein a cutoff frequency of the analog low-pass filter is between 100 kHz and 500 kHz.

* * * * *